United States Patent [19]

Bridges

[11] Patent Number: 4,900,886
[45] Date of Patent: Feb. 13, 1990

[54] MICROWAVE BEVERAGE MAKER

[75] Inventor: John A. Bridges, Nashville, Tenn.

[73] Assignee: Aladdin Industries, Inc., Nashville, Tenn.

[21] Appl. No.: 170,778

[22] Filed: Mar. 21, 1988

[51] Int. Cl.[4] .......................... A47J 31/00; H05B 6/80
[52] U.S. Cl. .............................. 219/10.55 E; 99/279;
99/302 R; 99/306; 99/DIG. 14; 426/241;
426/432
[58] Field of Search .................. 219/10.55 E; 99/279,
99/295, 299, 302 R, 304, 306, DIG. 14;
426/241, 243, 432, 433, 435

[56] References Cited

U.S. PATENT DOCUMENTS

| Re. 17,077 | 9/1928 | Pouget | 99/307 X |
|---|---|---|---|
| 1,396,613 | 11/1921 | Wiley | 99/279 X |
| 1,655,014 | 1/1928 | Herring | 99/307 |
| 1,754,553 | 4/1930 | Hagel . | |
| 2,594,132 | 4/1951 | Robbiati | 99/307 |
| 2,601,067 | 6/1952 | Spencer | 219/10.55 E |
| 2,688,911 | 9/1954 | Hochmayr | 99/302 R |
| 3,334,574 | 8/1967 | Douglas | 99/304 |
| 3,374,897 | 3/1968 | Martin | 99/304 X |
| 3,696,733 | 10/1972 | Beverett | 99/307 |
| 4,104,957 | 8/1978 | Freedman et al. | 99/283 |
| 4,122,833 | 9/1978 | Oda et al. | 99/425 |
| 4,262,585 | 4/1981 | Leuschner et al. | 99/280 |
| 4,286,136 | 8/1981 | Mason, Jr. | 219/10.55 E |
| 4,318,696 | 5/1983 | Koral | 99/304 |
| 4,356,382 | 10/1982 | Keramati et al. | 219/297 |
| 4,386,109 | 5/1983 | Bowen et al. | 426/241 |
| 4,505,926 | 3/1985 | Lu | 428/35 |
| 4,577,080 | 3/1986 | Grossman | 219/10.55 E |
| 4,642,443 | 2/1987 | Jorgenson et al. | 219/10.55 E |
| 4,655,123 | 4/1987 | Schrader | 99/279 |
| 4,704,510 | 11/1987 | Matsui | 219/10.55 E |

Primary Examiner—Derek S. Jennings
Assistant Examiner—David Osborn
Attorney, Agent, or Firm—Sandler & Greenblum

[57] ABSTRACT

A beverage maker includes a container having a portion for receiving a beverage made by passing hot water over an ingredient and a basket for holding a beverage ingredient provided at an upper end of the container. When hot liquid is supplied into the basket, a hot liquid and beverage ingredient mixture exits from the basket into the receiver portion. In embodiments of the present invention, the receiver portion and a reservoir from which the hot liquid originates are disposed side-by-side. Embodiments of the present invention have elements that shield the beverage ingredient from microwave energy and/or an element or elements that insulate the hot liquid and beverage ingredient mixture.

32 Claims, 2 Drawing Sheets

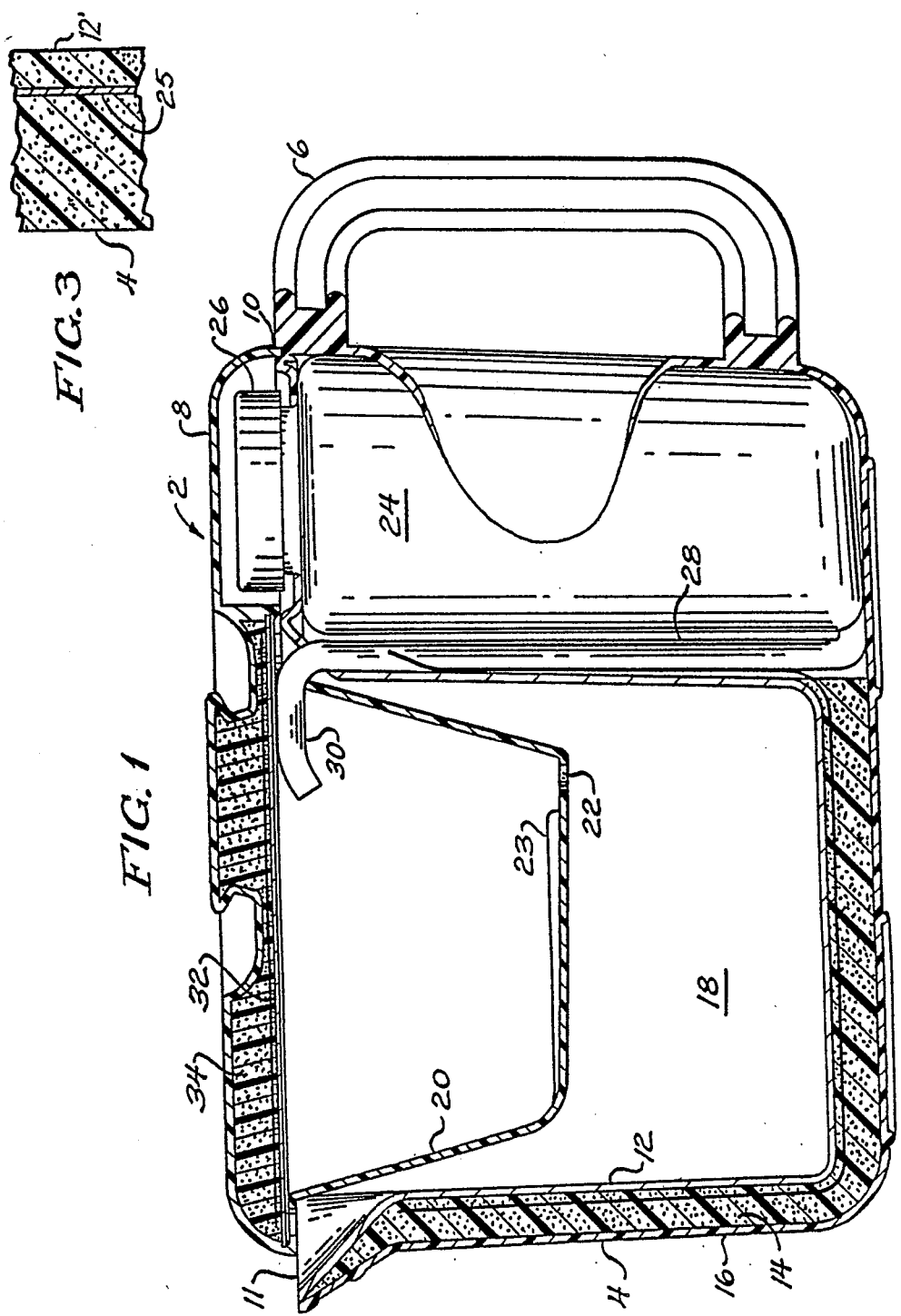

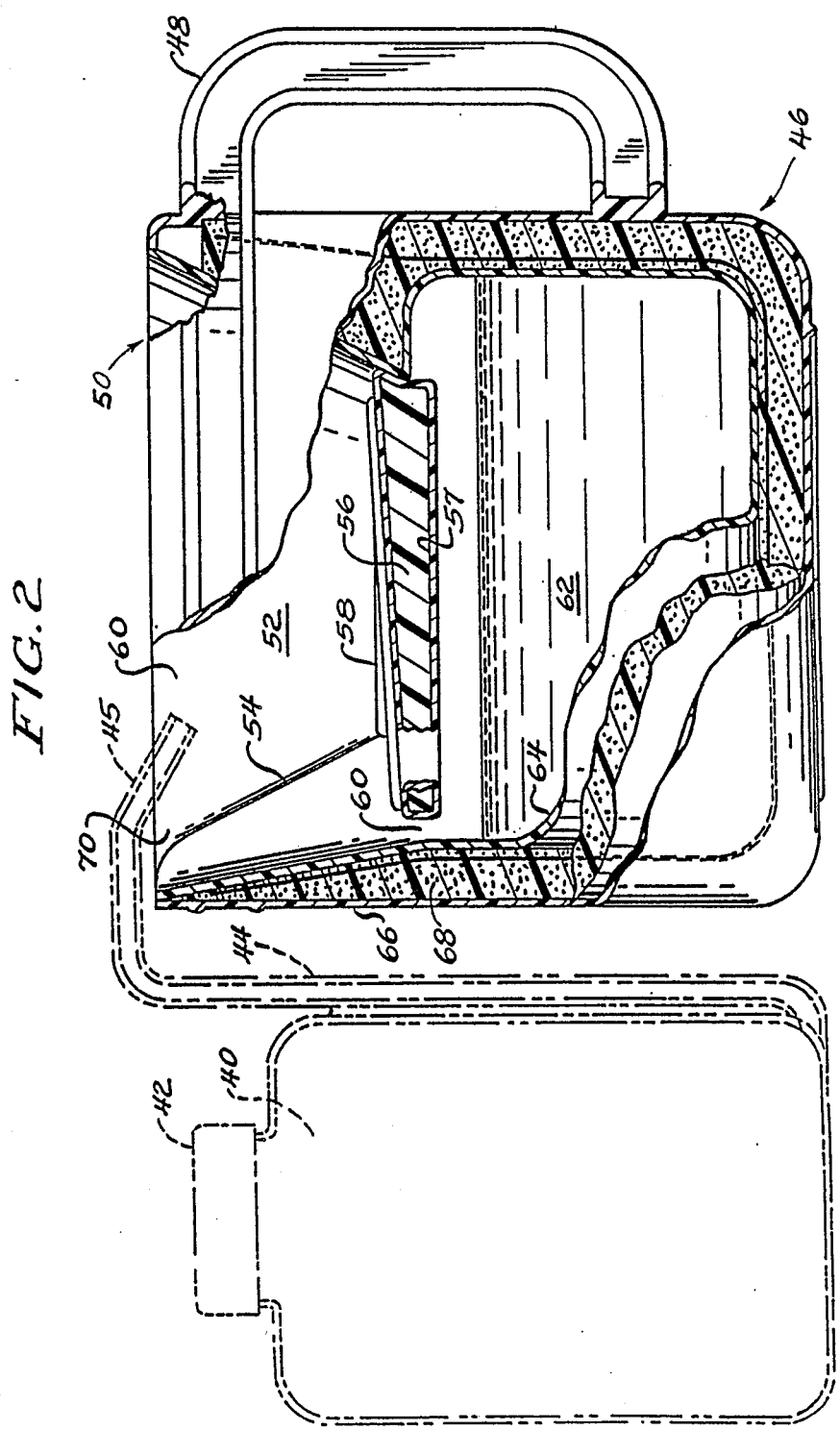

MICROWAVE BEVERAGE MAKER

BACKGROUND OF THE INVENTION

This invention relates generally to improvements in beverage makers or coffee brewers. More specifically, it relates to an improved device for brewing beverages using a microwave oven.

Obviously, devices for heating water and brewing beverages such as coffee or tea have been available for many years. However, with advent of the microwave oven and its now extensive use, a device or a method which takes full advantage of the microwave oven to rapidly heat water is desirable and useful.

Coffee, for instance, is most commonly made with a so-called percolator or by the drip method. In a percolator, water at the bottom of a pot is heated to rise upwardly in a tube and then fall downwardly through a perforated basket containing ground coffee. One type of percolator is shown in Hagel U.S. Pat. No. 1,754,553. A drip coffee maker is shown in the Keramati et al. U.S. Pat. No. 4,356,382. These and other patents such as the patent to Pouget Re. No. 17,077, Herring No. 1,655,014, Robbiati No. 2,594,132 and Beverett No. 3,696,733 all show coffee makers where water in a reservoir is heated, using either electric resistance heaters or by placing them on top of a stove, to then rise upwardly in a tube and fall through a basket or a filter containing the ground coffee.

One attempt with which the applicant is familiar to utilize a microwave oven to make coffee is a product sold under the name "Nordic Ware" which is of the percolator type. That is, there is a basket supported on a tube containing ground coffee that has a base resting in the bottom of a pot so that as the water is heated it will rise upwardly through the tube to circulate downwardly through the coffee in the basket. However, it is believed that a number of advantages over the foregoing discussed devices can be achieved by the invention herein disclosed.

Therefore, it is an object of this invention to provide a novel beverage maker to be used in microwave ovens.

It is another object of this invention to provide a novel beverage maker which can be used in microwave ovens to brew a beverage such as coffee and is capable of maintaining the coffee at an acceptable serving temperature for a period of time without continuously heating the coffee and thus destroying its flavor.

A still further object of this invention is to provide a novel beverage maker which is compact and capable of brewing relatively small amounts of beverage as desired.

BRIEF DESCRIPTION OF THE INVENTION

These and other objects of the invention are achieved by the provision of a beverage maker including an insulated container combined with a microwave shield encompassing the portion of the container intended to hold the brewed beverage and a separate unshielded portion to hold water intended to be heated to make the beverage.

BRIEF DESCRIPTION OF THE DRAWINGS

The invention itself is set forth in the claims appended hereto and form a part of this specification while an understanding of embodiments thereof may be had by reference to the detailed description and the drawings in which:

FIG. 1 is a sectional illustration of one embodiment of the invention;

FIG. 2 is a sectional illustration of an alternative embodiment of the invention and;

FIG. 3 is a partial sectional illustration of an alternative embodiment of the invention.

DETAILED DESCRIPTION

FIG. 1 illustrates a first embodiment of the invention in which a brewer 2 is provided in the form of a container or pot formed of any suitable plastic material. A handle 6 is formed on the container while a lid 8 is hinged at 10 on one end and extends to pouring spout 11. Alternatively, the lid may rest on top of the container and removed by simply lifting it off to provide access. The container is provided with an inner, generally cup-shaped lining 12, formed of microwave shielding material such as aluminum. As shown in FIG. 3, microwave shielding can also be provided by forming the cup-shaped lining or inner wall 12' of a plastic material and coating or wrapping it with aluminum foil as shown at 25. In this figure, 4 indicates the outer wall, while 12' indicates the inner wall. Insulation around the container is provided by foamed plastic material 14 between the inner wall 12 and an outer wall 16 of the container. Thus, there is provided a portion 18 to receive the beverage when brewed. Resting on the upper end of the portion 18 is a basket 20 to receive an appropriate filter when in use. An opening 22 in the bottom of the basket permits a beverage such as coffee to pass from the filter basket to the bottom of the receiver 18 during the brewing process. A number of ridges 23 (only one of which is shown) are provided on the bottom of the filter basket to space a filter from the bottom of the basket to insure a good flow of brewed coffee or the like to the opening 22.

The container 4 is dimensioned to receive a cold water reservoir 24 provided with a cap 26. As can be seen in FIG. 1, the reservoir 24 and the receiver portion 18 may be positioned adjacent to each other in a side-by-side non-overlapping relationship. A tube 28 extends from the bottom of the bottle upwardly provided with an outlet 30 emptying into the filter basket 20.

In use, when it is desired to make a beverage such as coffee, the lid 8 is rotated upwardly about its hinge 10 or removed exposing the reservoir 24 with its cap 26 and the interior of the filter basket 20. The cap 26 may then be removed to fill the bottle or reservoir 24. A filter may then be inserted in the filter basket and the desired beverage ingredient such as coffee added to the filter. When bottle cap 26 is secured to the reservoir, the lid 8 may then be closed and the entire device placed in a microwave oven.

When the oven is energized, the water in the reservoir will heat very rapidly causing a pressure to build up at the top of the reservoir over the surface of the water. This pressure will cause the water to rise in the tube 28 and exit through the opening 30, to drip down through the coffee and the filter and from there into the receiver 18 through the opening 22.

The coffee or other brewed beverage in the receiver 18 portion will remain hot by virtue of the foam insulation 14, but will not continue to be heated by the microwaves because of the shield 12 or 25 encompassing the container 18. To further insure against additional heating of the brewed beverage the lid 8 also includes a microwave shield 32 extending across the top of the filter basket 20 and therefore the receiver 18. The microwave shield 32 as may be seen closes off the bottom of the lid and provides a space 34 which may also contain a foam insulating material or simply provide air insulation to aid in maintaining the brewed beverage at the acceptable serving temperature. Moreover, as can readily be seen in the drawings (FIG. 1), the reservoir 24, by being situated between the outer wall 16 of the container and the portion 18, functions as an insulator to further aid in maintaining the brewed beverage at the acceptable serving temperature. In addition to protecting the contents of the brewed beverage receiver 18 from overheating or overboiling, the shield 32 in the lid likewise protects the coffee grounds or the like in basket 22 from being burnt or overroasted. Thus when the brewing action is complete, the entire container may be removed from the microwave oven and the beverage held at an elevated temperature for a period of time until it is consumed by pouring the contents into a cup or mug using the spout 11.

FIG. 2 discloses a second embodiment of the invention which may be used in a microwave oven or used in a more conventional way.

In this embodiment of the invention, a reservoir 40 with its cap 42 and an upwardly extending tube 44 are formed separately from a container 46.

In this embodiment, the container 46 is formed as a carafe or pot provided with a handle 48. An open top 50 is provided to provide access for a filter basket 52. The filter basket 52 is provided by molding a circular sloping side wall 54 in the container, having a bottom formed by a stopper 56. The stopper is formed as a double walled construction and microwave shielding 57 is provided by a material such as aluminum foil embedded therein. Formed on the top of the stopper 56 are a number of ridges 58 (only one of which is shown). The ridges 58 support the bottom of the filter while the spaces therebetween permit the liquid in the filter, during the brewing process, to flow from all portions of the bottom of the filter toward the end of the stopper 56 and through a space 60 provided between the end of the stopper and the inner wall of the container to its bottom portion or beverage receiver 62.

As before, the container is formed as a double walled structure having an inner wall 64 and an outer wall 66. A space between the inner and outer wall is filled with a foamed heat insulating material. The inner wall is formed of a microwave shielding material such as aluminum while the outer 66 wall is formed from a suitable plastic material. Again as in the case with the embodiment illustrated in FIG. 1, the alternative construction shown in FIG. 3 can be used, that is, aluminum foil may be embedded in the foam insulating material or used to wrap the inner wall of the container. A pouring spout 70 is provided on side of the container.

In the use of this embodiment of the invention, the reservoir 40 is filed with water up to a point below its top and the cap 42 is then screwed tightly onto the reservoir 40. A standard paper filter is placed in the upper portion of the container to rest on the ridges 58 and the ground drip coffee is added in the proper amount. The container and the reservoir are then placed in a microwave oven and the oven energized to heat the water. As before, as the water is heated, pressure on its upper surface is increased forcing it upwardly through the tube 44 and out of the spout 45 into the filter basket 52. After the brewing process is complete, because all of the water passing through the coffee has dripped through the opening into the receiver 62, the container may be removed from the opening and the coffee maintained hot by virtue of the insulation provided. Again as before, during the brewing process, because of the microwave shield 64, the brewed coffee does not continue to be heated by virtue of the microwave energy, so that the coffee does not overheat and therefore retains its flavors.

Because the reservoir 40 in this embodiment of the invention is separate from the container or beverage brewer itself, several advantages result. The first is that once the beverage is made, the container 46 may be used as a carafe and beverages poured from it as needed. It may be noted that the carafe in this configuration may be smaller and lighter for any given volume of brewed beverage and therefore easier to handle. Another advantage is that the container 46 need not have its hot water supplied from the reservoir 40. That is to say, water can be heated from any source and poured into the filter basket opening in order to make a beverage and a beverage so made will be maintained at an acceptable serving temperature by virtue of the insulated construction.

Obviously, modifications can be made other than those shown or suggested in the detailed description and drawings and it is intended by the claims to cover all such modifications as common within their scope.

What is claimed as new and desired to be secured by Letters Patent is:

1. A beverage maker comprising:
   (a) a container having a receiver portion for receiving a beverage made by passing hot liquid over an ingredient, said receiver portion having a wall which reflects microwave energy;
   (b) a basket for holding a beverage ingredient at an upper end of said container;
   (c) means for supplying hot liquid into said basket to flow over said beverage ingredient; and
   (d) means for permitting the hot liquid and said beverage ingredient to exit from said basket into said receiver portion;
   wherein said receiver portion and said means for supplying a hot liquid are disposed side-by-side.

2. A beverage maker as set forth in claim 1 wherein said wall extends upwardly to encompass said basket to prevent microwave heating of the basket.

3. A beverage maker as set forth in claim 1 or 2 including a lid extending over said basket and wherein said lid is provided with a shield reflecting microwave energy covering the upper end of said basket.

4. A beverage maker as set forth in claim 1 or 2 wherein an opening is provided in the bottom of said basket and the bottom of said basket slopes toward said opening.

5. A beverage maker as set forth in claim 1 or 2 wherein said means for supplying a hot liquid to said basket comprises a reservoir having a removable cap to provide for filling of the reservoir, and an exit tube extending upwardly from the bottom of the reservoir and provided with a spout permitting a flow of hot liquid into said basket.

6. A beverage maker as set forth in claim 5 wherein said reservoir is an integral part of said container.

7. A beverage maker as set forth in claim 5 wherein a handle is provided on said container.

8. A beverage maker as set forth in claim 7 wherein a stopper extends partially across said container intermediate its height to form the bottom of said basket.

9. A beverage maker as set forth in claim 8 wherein at least one ridge is provided on an upper surface of said stopper to space the beverage filter from said surface to permit liquid to flow through the bottom of a filter held in said basket.

10. A beverage maker as set forth in claim 5 wherein said reservoir is formed separately from said container.

11. A beverage maker as set forth in claim 5 wherein at least one ridge is provided on said basket to space a filter from the bottom of said basket.

12. A beverage maker in accordance with claim 1, wherein said means for supplying a hot liquid includes a reservoir.

13. A beverage maker in accordance with claim 12, wherein said reservoir is disposed in side-by-side fashion with respect to said receiver portion.

14. A beverage maker in accordance with claim 1, wherein said means for permitting comprises means for conducting a hot liquid and beverage ingredient mixture into said receiver portion.

15. A beverage maker comprising:
   (a) a container having a receiver portion for receiving a beverage made by passing a hot liquid over an ingredient;
   (b) a basket having an open top for holding a beverage ingredient at an upper end of said receiver portion;
   (c) means for permitting the hot liquid and said beverage ingredient to exit from said basket and into said receiver portion;
   (d) means for shielding said beverage ingredient from microwave energy, said shielding means including a cover selectively positionable over the open top of said basket; and
   (e) said receiver portion including a wall which reflects microwave energy, and wherein said means for shielding said beverage ingredient from microwave energy further comprises a portion of said wall which extends upwardly to encompass said basket.

16. A beverage maker as recited in claim 15, wherein said cover is pivotable over the open top of said basket, said cover being provided with a shield for reflecting microwave energy.

17. A beverage maker as set forth in claim 15, wherein said means permitting the hot liquid and said beverage ingredient to exit comprises an opening in a bottom portion of said basket and the bottom portion of said basket slopes toward said opening.

18. A beverage maker as recited in claim 15, further comprising means for supplying hot liquid into said basket to flow over said beverage ingredient.

19. A beverage maker as recited in claim 18, wherein said means for supplying a hot liquid into said basket comprises a reservoir having a removable cap to provide for filling of said reservoir, and an exit tube extending upwardly from said reservoir and provided with a spout for dispensing a flow of hot liquid into said basket.

20. A beverage maker as recited in claim 19, wherein said reservoir is an integral part of said container.

21. A beverage maker as recited in claim 19, wherein said reservoir and said receiver portion are positioned in side-by-side fashion.

22. A beverage maker as recited in claim 18, wherein said means for supplying a hot liquid to said basket comprises a reservoir and an exit tube extending upwardly from the bottom of the reservoir and provided with an exit opening.

23. A beverage maker comprising:
   (a) a container having a receiver portion for receiving a beverage made by passing hot liquid over a beverage ingredient, said receiver portion including means for reflecting microwave energy away from the interior of said receiver portion and said container including foam for insulating the interior of said receiver portion;
   (b) a basket for holding a beverage ingredient at an upper end of said receiver portion;
   (c) means for supplying said hot liquid into said basket to flow over said beverage ingredient; and
   (d) means for permitting the hot liquid and said beverage ingredient to exit from said basket into said receiver portion.

24. A beverage maker as recited in claim 23, wherein said foam surrounds at least one wall of said receiver portion.

25. A beverage maker as recited in claim 23, wherein said foam surrounds at least two walls of said receiver portion.

26. A beverage maker as recited in claim 25, wherein said foam is further positioned beneath a bottom wall of said receiver portion.

27. A beverage maker as recited in claim 23, wherein said means for supplying said hot liquid includes a reservoir which serves to further insulate the interior of said receiver portion.

28. A beverage maker comprising:
   (a) a container having a receiver portion for receiving a beverage made by passing hot liquid over a beverage ingredient, said container including means for insulating the interior of said receiver portion;
   (b) a basket for holding a beverage ingredient at an upper end of said receiver portion;
   (c) means for supplying said hot liquid into said basket to flow over said beverage ingredient, said means for supplying including a reservoir, said reservoir and said receiver portion being positioned adjacent to each other in side-by-side fashion;
   (d) means for permitting said hot liquid and said beverage ingredient to exit from said basket into said receiver portion; and
   (e) said means for insulating include foam material along the bottom and one side of said receiver portion and said reservoir along a second side of said receiver portion.

29. A beverage maker comprising:
   (a) a container having a receiver portion for receiving a beverage made by passing hot liquid over a beverage ingredient, said container including means for insulating the interior of said receiver portion;
   (b) a basket for holding a beverage ingredient at an upper end of said receiver portion;
   (c) means for supplying said hot liquid into said basket to flow over said beverage ingredient, said means for supplying including a reservoir, said reservoir and said receiver portion being positioned adjacent to each other in side-by-side fashion in a non-overlapping relationship;
   (d) means for permitting said hot liquid and said beverage ingredient to exit from said basket into said receiver portion; and
   (e) said means for insulating include said reservoir.

30. A beverage maker in accordance with claim 29, said container further comprising means for reflecting microwave energy away from the interior of said receiver portion.

31. A beverage maker comprising:
(a) a container having a receiver portion including an interior for receiving a beverage made by passing hot liquid over a beverage ingredient, said container including means for insulating the interior of said receiver portion;
(b) a basket for holding a beverage ingredient at an upper end of said receiver portion;
(c) means for supplying said hot liquid into said basket to flow over said beverage ingredient, said means for supplying including a reservoir, said reservoir and said receiver portion being positioned adjacent to each other in side-by-side fashion;
(d) means for permitting said hot liquid and said beverage ingredient to exit from said basket into said receiver portion; and
(e) means for reflecting microwave energy away from the interior of said receiver portion.

32. A beverage maker comprising:
(a) a container having a receiver portion for receiving a beverage made by passing a hot liquid over an ingredient;
(b) a basket having an open top for holding a beverage ingredient at an upper end of said receiver portion;
(c) means for permitting the hot liquid and said beverage ingredient to exit from said basket and into said receiver portion;
(d) means for shielding said beverage ingredient from microwave energy, said shielding means including a cover selectively positionable over the open top of said basket; and
(e) means for supplying hot liquid into said basket to flow over said beverage ingredient, said means for supplying hot liquid to said basket comprising a reservoir and an exit tube extending upwardly from the bottom of the reservoir and provided with an exit opening.

* * * * *